United States Patent Office 2,993,725
Patented July 25, 1961

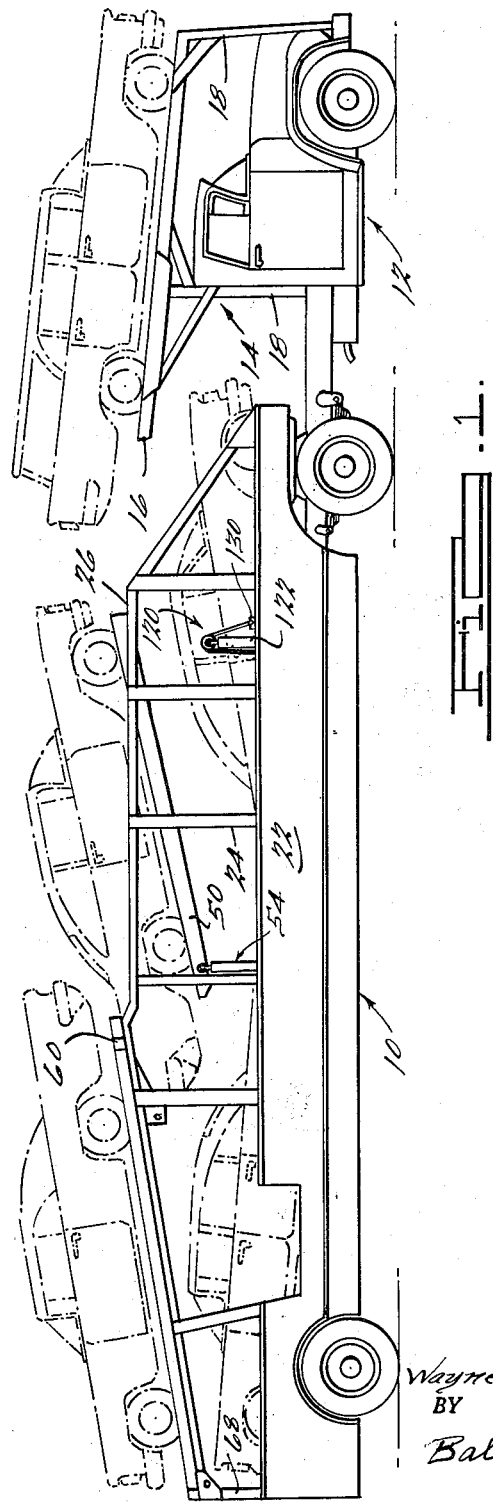

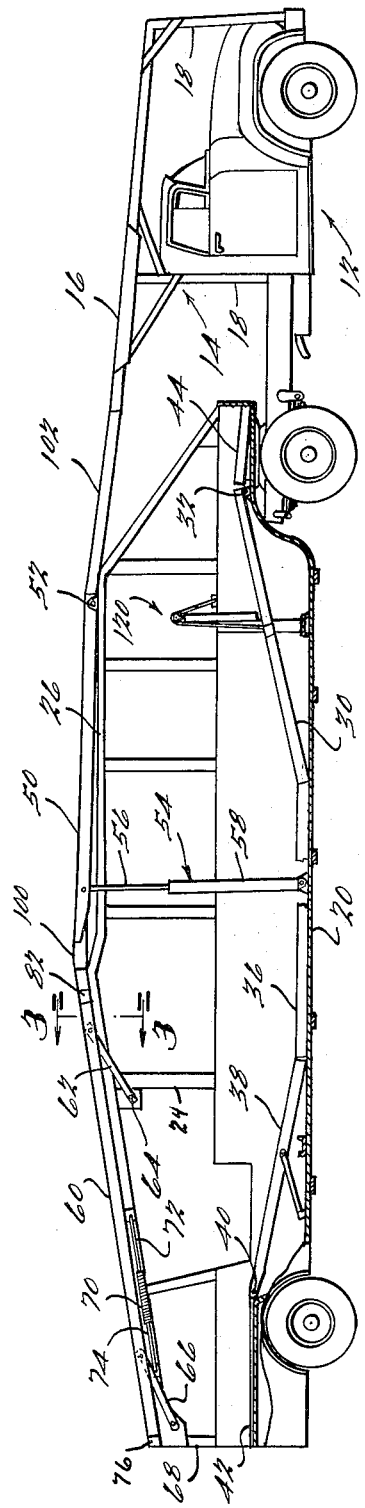

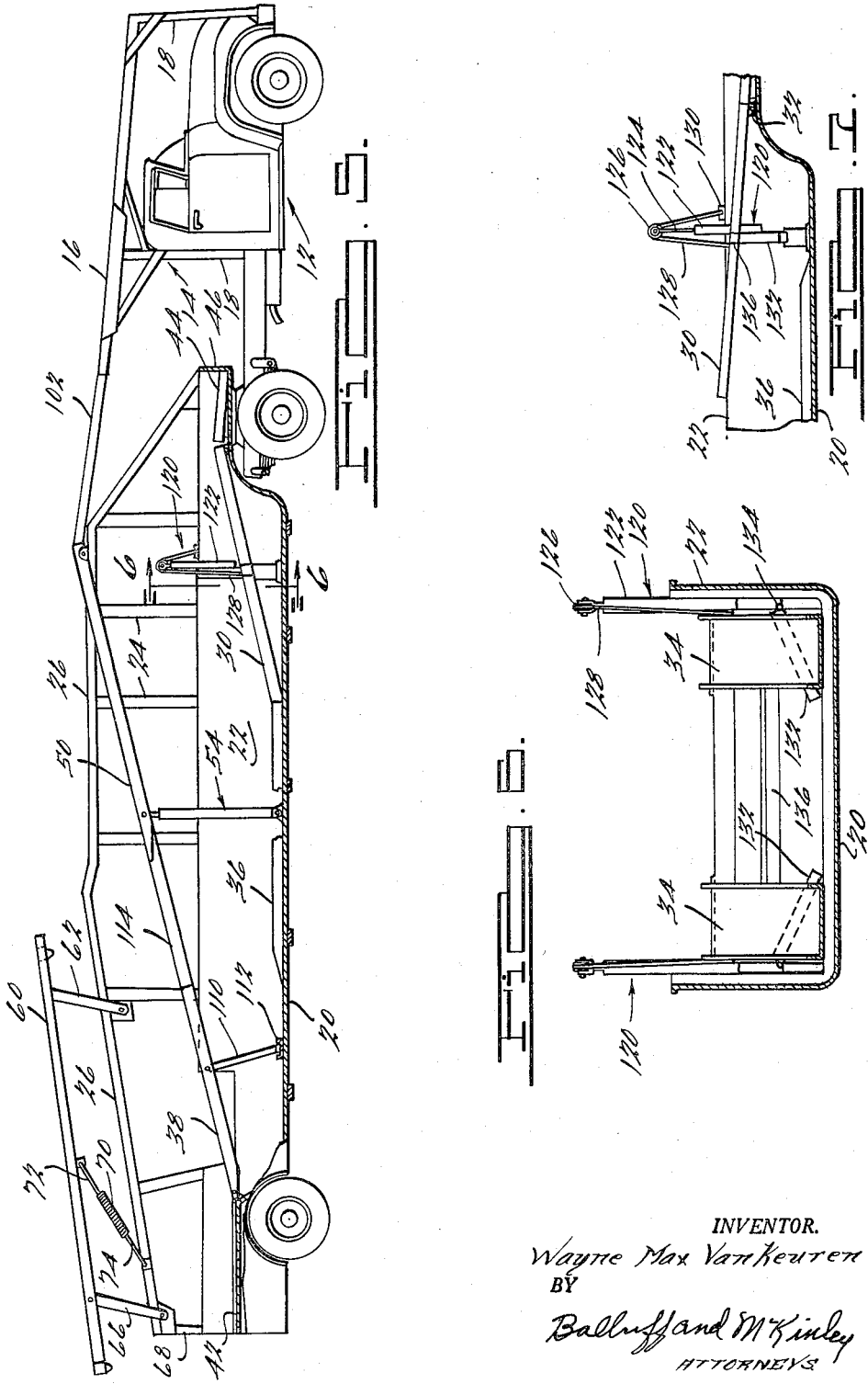

2,993,725
AUTOMOBILE TRAILER

Wayne Max Van Keuren, Pontiac, Mich., assignor to Highwood Service, Inc., Pontiac, Mich., a corporation of Michigan
Filed June 21, 1960, Ser. No. 37,783
4 Claims. (Cl. 296—1)

This invention relates to trailers of the kind used for hauling automobiles over the highway. The invention is particularly directed to a trailer of this type having the upper and lower supporting tracks arranged so as to provide the maximum loading capacity while maintaining the loaded height of the trailer at a minimum.

One of the essential considerations in the design of an automobile trailer is that the loaded height of the trailer be kept at a minimum so that the trailer may be used on highways or roads which have viaducts or bridges of relatively low clearance. A further consideration is that trailers of this type must haul the maximum number of cars to be commercially satisfactory and must also be capable of being loaded and unloaded in the shortest possible time by a single operator. The problem of designing a trailer which will meet the above requirements has been complicated in recent years by the increased size of the automobiles. Furthermore, the trailer should be designed so that it can accommodate not only the large or standard size automobiles but also the so-called compact cars which are now manufactured by all of the principal motorcar manufacturers. The present invention is directed to a trailer which is designed so that it can accommodate five of the larger or standard size automobiles or six of the compact cars, or any combination of cars totalling six in number so long as there are no more than three of the larger cars. While trailers of this kind have heretofore been designed which can haul five of the larger cars, such trailers are not satisfactory for use on roads which have bridges and viaducts of relatively low clearance. The trailer described herein has a sufficiently low loaded height, can be easily loaded and unloaded, and at the same time can be used to haul either the large or compact cars in the numbers indicated above without necessitating any substantial alteration of the trailer.

A principal object of the invention is to provide a new and improved trailer for hauling automobiles.

Another object of the invention is to provide a trailer of the type described which is capable of transporting five of the standard size American automobiles being manufactured today at a minimum loaded height and in which the loading and unloading can be accomplished very rapidly by a single operator.

A further object of the invention is to provide a trailer which may be used to haul five of the standard size American cars or six of the compact cars, or a combination of standard and compact cars without requiring any substantial alteration of the trailer.

A further object of the invention is to provide a trailer of the type described having a new and improved arrangement of the upper and lower track sections so as to enable fast loading and unloading of the cars and transport of the cars at a minimum loaded height.

Other and further objects of the invention will be apparent from the following description and claims and may be understood by reference to the accompanying drawings, of which there are three sheets, which by way of illustration show a preferred embodiment of the invention and what I now consider to be the best mode of applying the principles thereof. Other embodiments of the invention may be used without departing from the scope of the present invention as set forth in the appended claims.

In the drawings:
FIG. 1 is a side elevational view of a trailer according to this invention loaded with five of the standard size American cars;
FIG. 2 is a side elevational view with parts broken away and illustrating the upper and lower track sections of the trailer;
FIG. 3 is an enlarged sectional view taken on line 3—3 of FIG. 2;
FIG. 4 is an enlarged fragmentary elevational view illustrating a locking mechanism for the upper rear ramp of the trailer;
FIG. 5 is a view similar to FIG. 2 showing certain of the ramps in a different position thereof;
FIG. 6 is a sectional view taken on line 6—6 of FIG. 5; and
FIG. 7 is a fragmentary elevational view of a part of the structure shown in FIG. 5, but showing the same in a different position thereof.

The trailer comprises a trailer body 10 adapted to be hauled by a cab 12 which is provided with a fixed overhead rack 14, including spaced longitudinally extending channel tracks 16 supported on vertical frame members 18. The trailer 10 comprises a trailer body having a floor 20 and side walls 22 which include vertically extending frame members 24 at each side of the body and longitudinally extending top frame members 26 secured to the upper ends of the vertical frame members 24 at each side of the trailer.

The lower supporting track of the trailer includes a front ramp 30 which is pivoted at its forward end on an axle 32 to the floor of the trailer. The trailing end of the ramp 30 is adapted to rest on the floor 20, and the ramp includes parallel track sections 34 of channel shape, or any other suitable design, and connected together by suitable cross braces to form a unitary structure which is pivoted on the axle 32. A fixed central track section 36 is secured on the floor of the trailer in line with the ramp 30. A rear ramp 38 is pivoted at its trailing end to the floor of the trailer by an axle 40 and the forward end of the ramp 38 when its lowered position aligns with the track section 36. The rear deck 42 of the trailer may be provided with suitable track elements which, together with the front and rear ramps 30 and 38 and the central section 36, form a continuous track along which cars may be driven from a loading dock onto the floor of the trailer. A short fixed track section 44 is aligned with the forward end of the front ramp 30 so that the wheels of the forward car on the floor of the trailer may be driven up to the front end wall 46 in the manner illustrated in FIG. 1.

The upper supporting track for transport of cars includes the overhead cab rack 16 and a ramp 50 which is pivoted at its forward end on an axle 52 which is supported by and extends between the top frame members 26. The ramp 50 may be similar in construction to the ramp 30 and includes parallel track elements and cross braces forming a unitary ramp which is pivoted on the axle 52. The trailing end of the ramp 50 may be raised and lowered by means of a hydraulic unit 54 at each side of the trailer, including a piston 56 pivotally connected to the trailing end of the ramp 50 and working within a cylinder 58 pivotally mounted on the floor of the trailer and provided with suitable connections for supplying and exhausting hydraulic fluid to and from the cylinder 58. The upper supporting track further includes a ramp 60 which likewise consists of spaced parallel track sections and suitable cross supports. The ramp 60 is supported by a parallelogram linkage consisting of a pair of links 62 pivoted at one end 64 to one of the vertical frame members 24 and at their other ends to the sides of the ramp 60. The links 66 are also pivotally connected at one end to the ramp 60 and at their other ends to the vertical frame members 68 at the rear corners of the trailer body. The ramp 60 is thus movable by means of the links 62 and 66 between the positions illustrated in FIGS. 2 and 5. A spring 70 is provided at each side of the ramp and has one end 72 connected to the ramp adjacent its midpoint and its other end 74 connected to the adjacent top frame member 26. The ramp 60 is adapted to be held in its lowered position illustrated in FIGS. 1 and 2 by any suitable clamping arrangement such as that shown in FIG. 4 and, when the clamps are released, the springs 70 will pull the ramp to the upper position shown in FIG. 5.

The ramp 60 may include a cross brace 76 at its trailing end provided at its opposite ends with conical lugs 78 adapted to be received in sockets 80 formed in the upper ends of the corner posts 68 when the ramp 60 is in its lowered position. A similar cross brace 82 at the forward end of the ramp may be provided with similar lugs received within sockets provided on the top frame members 26. Any suitable clamping means may be used to lock the ramp against the frame and may comprise links 84 receiving hooks 86 secured on the cross frame members 76 and 82, each link 84 being pivoted to a lever 88 which is pivoted to a lug 90 on the frame. A similar locking arrangement may be provided for locking the ramp 50 in its lowered position.

When the trailer is to be loaded, the lower ramps 30 and 38 are in their lowered positions shown in FIG. 2, while the forward upper ramp 50 is in its elevated position shown in FIG. 2. The ramp 60 is released by the locking mechanism described so that the springs 70 pivot the ramp 60 to the raised position shown in FIG. 5. A car may then be driven along the lower track onto the front lower ramp 30 and a second car driven onto the lower track so that one set of wheels rests on the central track 36 and the other on the rear deck 42 in the manner shown in FIG. 1. This is permitted since pivoting of the ramp 60 to its raised position provides sufficient clearance between the ramp 60 and the floor of the trailer for the passage of cars into the lower track. The upper track may then be loaded by lowering the ramp 60 and locking the same in place in the manner described. The cars may be driven up suitable skids onto the ramp 60 and across skids 100 which may bridge the gap between the forward end of the ramp 60 and the trailing end of the ramp 50 onto the ramp 50. The skids 100 may be detachably secured to either or both of the ramps 50 and 60 and similar but longer skids 102 may be employed for bridging the gap between the forward end of the ramp 50 and the trailing end of the cab rack 16. The first car to be loaded on the upper track is driven onto the cab rack 16 and the skids 102 may then be removed. The second car is driven onto the ramp 50 and, after the skids 100 have been removed, the hydraulic unit 54 may be actuated to retract the piston 56 to lower the ramp 50 to the position shown in FIG. 1 in which one end of the car overhangs one end of the trailing car supported on the bottom of the trailer. A third car is then driven onto the ramp 60 to complete the loading. The cars may be chained down in a conventional manner and the conventional apparatus employed for this purpose is not illustrated herein. The unloading may be accomplished in the reverse order. It will be noted that for loading and unloading in the manner described, only one hydraulic unit need be employed. The weight of the pivoted ramp 60 is counterbalanced by the springs 70 so that the ramp can easily be swung to its lower position by a single operator.

An alternative loading arrangement is illustrated in FIG. 5, which provides an alternative arrangement for loading over the cab and for loading the ramp 50. The rear lower ramp 38 is provided at each side thereof with a supporting leg 110 which is pivoted at one end to the ramp 38 and adapted to engage at its other end within a retaining lug 112 secured on the floor of the trailer. The ramp 38 may be raised manually and the supporting legs engaged within the lugs 112 to support the ramp 38 in the elevated position shown in FIG. 5. When the ramp 38 is to be lowered, it is lifted slightly and the supporting legs 110 removed from the lugs 112 and folded rearwardly so as to lie against the floor in the manner shown in FIG. 2. With the ramp 38 in its raised position and the ramp 50 in its lowered position so as to be in alignment with the ramp 38, a pair of skids 114 are detachably secured to the ramps to provide a continuous track from the ramp 38 to the ramp 50 along which cars may be driven with the pivoted ramp 60 in its raised position.

When the trailer is to be used for carrying a number of the compact cars, the loading of the compact cars in the bottom of the trailer is different than the loading arrangement previously described. It is possible to carry three compact cars in the bottom of the trailer, and this is accomplished by first driving a car onto the ramp 30 while the same is in its lowered position, with the front wheels of the car resting on the forward tracks 44 and the rear wheels of the car supported on the trailing end of the ramp 30. The ramp 30 is then raised to the position shown in FIG. 7 by means of a hydraulic unit 120 at each side of the trailer and consisting of a cylinder 122 containing a piston 124 provided at its upper end with a pulley or roller 126 receiving a cable 128 which has one end secured at 130 to the frame of the trailer and its other end secured to the ramp 30 so that the ramp will be raised to the position shown when the hydraulic fluid under pressure is supplied to the cylinders 122. The car on the ramp 30 is transported with the ramp in its elevated position, but the hydraulic units 120 are not relied upon to support the car and ramp in this position during transport. As shown in FIGS. 6 and 7, a prop 132 is provided at each side of the trailer adjacent the hydraulic unit 120 and is pivoted as at 134 to the trailer frame and normally lies in the position shown in FIG. 6 in which it extends beneath the ramp 30 with the latter in its lower position. When the ramp has been raised by the hydraulic unit 120, the props 132 are swung upwardly into engagement with the underside of a cross brace 136 provided on the ramp 30. When the hydraulic units are deactuated, the ramp 30 and the car thereon will be supported in the raised position by the props 132. The second car to be supported on the floor of the trailer is then driven in until the hood or the rear deck of such car extends beneath the trailing end of the ramp 30. This provides sufficient space for a third compact car to be supported on the rear ramp 38. The loading of the upper track in the case of the compact cars may be the same as previously described.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A trailer for hauling automobiles comprising a trailer body having a floor and vertically extending side frame members and longitudinally extending top frame members secured to the vertical frame members at each side of the trailer, lower track means supported on the floor of the trailer and comprising a front ramp pivoted at its front end to the floor, a fixed central section, and a rear ramp pivoted at its trailing end to the floor of the trailer, said ramps when in their lowered positions thereof resting on the floor to form a continuous track over which cars may be driven so that one car may be supported on said front ramp, means for pivoting said front ramp to an elevated position so that a second car may be supported on said central section with one end of said second car extending beneath the trailing end of said front ramp, and so that a third car may be supported on said rear ramp, upper track means supported on said frame members comprising a forward ramp pivotally mounted at its front end on said top frame members and a movable ramp disposed rearwardly thereof, a parallelogram type linkage means supporting said movable ramp on said frame members for swinging movement between an upper position to provide clearance for cars driven onto said lower track means and a lower transport position, and means for raising and lowering the trailing end of said upper forward ramp with a car supported thereon when said movable ramp is in its upper position so that one end of such car may extend between the car on said lower rear ramp and a car supported on said movable ramp.

2. In a trailer for hauling cars and including a cab having a fixed overhead rack onto which a car may be driven for transport over the cab, said trailer including upper and lower track means on which cars are supported during transport, said lower track means comprising a front ramp pivoted at its forward end adjacent the forward end of the trailer, a central track section and a rear ramp pivoted at its trailing end adjacent the rear end of the trailer, said upper track means comprising a front ramp pivoted at its front end to the front end of the trailer and a movable ramp disposed rearwardly thereof, linkage means supporting said movable ramp for movement between a lower transport position and an upper position in which all portions of said ramp are moved vertically away from said lower track means to provide clerance for cars being driven onto and off of said lower track means, said upper front ramp and said lower rear ramp being pivotable into substantial alignment with each other to provide a track over which cars may be driven onto and off of said upper front ramp and said cab rack.

3. A trailer according to claim 2 wherein said linkage means comprises a parallelogram support for said movable ramp, and spring means urging said movable ramp to its upper position.

4. A trailer according to claim 3 including means for locking said movable ramp in its lower position.

References Cited in the file of this patent

UNITED STATES PATENTS

| | | |
|---|---|---|
| 1,812,097 | Judd | June 30, 1931 |
| 2,039,492 | Perkins et al. | May 5, 1936 |
| 2,132,464 | Francis | Oct. 11, 1938 |
| 2,695,810 | Demos | Nov. 30, 1954 |